United States Patent Office 2,958,594
Patented Nov. 1, 1960

2,958,594

TRACE ELEMENT FERTILIZER

Benjamin D. Halpern, Jenkintown, Pa., and Robert B. Dean, Bainbridge, N.Y., assignors to The Borden Company, a corporation of New Jersey No Drawing. Filed Sept. 4, 1956, Ser. No. 607,561

2 Claims. (Cl. 71—1)

This invention relates to a fertilizer composition and the process of making it. It relates more particularly to a fertilizer including essential trace elements that are available for plant nutrition under conditions favorable to slow but more complete utilization of the elements than heretofore realized.

It has now been known for many years that plants require trace amounts of certain metals such as manganese, iron, copper, molybdenum, and zinc and also boron.

The present invention provides a source of such elements in form that, in the soil, becomes slowly available to plants in contact with a continuing supply of nitrogen of the fertilizer and that is not fixed or otherwise made unavailable by components of the soil.

Briefly stated, the invention comprises the process of and the product resulting from the uniform and intimate association of a compound of trace elements, particularly the transition metals, with an aminoplast at the stage of being at least appreciably soluble in water so as to form a complex with the metal trace element. In the commercial embodiment, the association is effected by the condensation of formaldehyde and urea or the like and the combination of the trace element in the product, by coordination or otherwise, so as to reduce or essentially eliminate the ionic reaction of a substantial part at least of the said element when the composition is in contact with the soil.

The condensation is discontinued at a stage at which the product is so insoluble in water as to separate in part at least, as a gel or as a precipitate, from the aqueous solution in which the condensation is effected but before there is lost the extremely slight solubility causing the finished condensation product, when applied in powdered or fine granular form to soil, to be dissolved slowly as in the course of a few months or so.

As to the materials, we use formaldehyde in any of the usual forms for making aminoplast resins as, for instance, aqueous solutions of formaldehyde or paraformaldehyde.

As the nitrogen containing material to be condensed with the formaldehyde, we use urea or a simple homolog thereof. Materials such as melamine or guanidine are less effective and they are also more expensive per unit of nitrogen content.

The trace elements may be any one of the metals listed above or generally recommended for use in agriculture or horticulture. In addition, there may be included other materials which, so far as now known, act only additively in our composition, as, for example, a systemic insecticide such as selenium, a potash or phosphate fertilizer, and a component such as iodine that is desired in the grown plant product for human use.

The trace element to be used is introduced in the form of a compound that is non-toxic to plants, that is, non-toxic under the conditions and in the proportions used and in the form of a compound of the said element that is at least slightly soluble in water at the pH of contact of the compound with the urea and formaldehyde composition, as in the acidified aqueous solution. Thus the metal trace elements may be and suitably are introduced in the form of metal chlorides, sulfates, acid phosphates, oxides, hydroxides, or carbonates. Boron also may be introduced, as in the form of borax, other alkali metal borate, boric acid, or boric oxide. Selenium and iodine, when used, may be in the form of a selenium oxide, potassium iodide, or the like.

As to proportions, the molecular ratio of formaldehyde to urea is within the range 0.5–1 mole and, for best results, 0.7–0.8 mole, for 1 of the urea.

The compound of the trace elements may be used in varying proportions depending upon the estimated degree of depletion of the trace element in the soil to which the fertilizer is to be applied. Ordinarily, we use the trace elements in about the following proportions of each, expressed as mgs. per g. of the urea formaldehyde condensation product on the dry basis: boron, copper and manganese, 0.2–2; iron, 0.4–4; molybdenum and zinc, 0.2–0.4. For most commercial purposes, it is recommended that the proportion of the several trace elements be about one-fourth of the maximum figures in the above ranges.

As to conditions of manufacturing the new fertilizer composition, we form an acidic aqueous mixture including the formaldehyde, urea, and, either suspended in finely divided condition or dissolved, a compound of the trace element that is to be represented in the finished product. In one embodiment, we mix aqueous formaldehyde and the compound of the selected trace element, establish the pH at the desired level on the acid side of 7, then introduce the urea slowly, and heat the whole until the last of the urea has been added and separation of the condensation product occurs.

Acid is added to the condensation mixture in amount if any required to maintain acidic condition such as about 3.5–4.5 at the completion of the condensation.

Other pH levels outside this range may be used somewhat less conveniently, as, for example, 2.5–6. At low pH's, the rate of condensation is so rapid as to be difficult to control. At pH's as high as 5.5–6, the rate is objectionably slow.

The temperature of the condensation is not above refluxing under the conditions used and is suitably about 65°–80° C.

After the last of the reactants has been introduced, the heating is continued until the insoluble condensation product separates either, as a precipitate or as a gel, in a specimen removed from the batch and tested by moderate cooling, as at 35° C. When this separation occurs on cooling, heating of the batch is discontinued so as to leave the condensation product at a stage of having become substantially insoluble in water without being advanced to a more highly insoluble stage in which trace elements would become unavailable or objectionably slowly available as plant food in soil to which the composition is applied.

The product so made is then dewatered. Thus the mixture in which the condensation product separates may be subjected to belt-drying or to spray-drying at elevated temperature, as at about 80°–100° C.

In any case, the trace element is incorporated either before drying is completed or later in water wet condition. When the trace element is substantially completely insoluble in water, then the element must be introduced, either when the condensation mixture is still acidic or later in conjunction with both water and acid to establish a pH below 7.

The invention will be further illustrated by description in connection with the following specific examples of the practice of it. Proportions here and elsewhere herein are expressed as parts by weight except when specifically stated to be molar.

Example 1

272 parts of aqueous 44% formaldehyde solution are neutralized to a pH of 7.0 wtih approximately 0.5 part of sodium carbonate. 248 parts of urea are added and the mixture heated to 38° C. to dissolve the urea. The solution is then cooled to 15° C. and 10 parts of a solution containing 5 parts of $CuSO_4.5H_2O$ and 10 parts of $FeSO_4.7H_2O$ (in 10 parts of 10% sulfuric acid and 20 parts of water) are added. Additional 10% sulfuric acid is added to bring the pH down to 3.5. The mixture is stirred vigorously until it sets to a friable paste. The product is then promptly broken up and neutralized with an excess of ammonia gas in a covered container.

The final product is a granular brown material soluble in water at a slow but appreciable rate and suitable as a source of nitrogen, copper, and iron.

Example 2

A solution containing the following materials in the number of parts shown

| | |
|---|---|
| $H_2SO_4$, 10% | 1000 |
| $CuSO_4.5H_2O$ | 256 |
| $FeSO_4.7H_2U$ | 700 |
| $MnSO_4.H_2O$ | 170 |
| $ZnSO_4.H_2O$ | 25 |
| Water | 2000 | is first prepared as a mixture of trace elements suitable for incorporation in the resin. The solution is dark blue in color.

23 parts of 44% formaldehyde are neutralized with 63 parts of borax to a pH of 9.1. 25 parts of urea are added and the mixture warmed to 40° C. to dissolve the urea. The solution is then cooled to 21° C. and one part of the said solution described above is added. The pH is further adjusted to 2.8 with 10% sulfuric acid. When the solution becomes milky, it is transferred to a double action dough mixer and agitated until it breaks up into small chunks, the dough mixer being kept below 54° C. with circulating cold water. The product is then reduced to small friable particles. Then 54 parts of 26° Bé. ammonia are added and mixing continued until the odor of ammonia is barely detectable. The product is then passed through a 4 mesh screen and dried to a moisture content of 4%.

Example 3

1 mole, 60 parts of urea is mixed with 1.33 mole, 40 parts of paraformaldehyde and 40 parts of water. The mixture is adjusted to pH 8.0 with a drop of sodium hydroxide and then brought to the boil at which time it forms a nearly clear homogeneous solution. The mixture is rapidly cooled to 21° C. and then acidified with sulfuric acid to a pH of 3.7. One half part of ferrous sulfate is added. The temperature increased spontaneously to 49° C. in about two minutes, at which point the product is poured into an aluminum pan at room temperature to a depth of about ⅜ inch and allowed to solidify.

The freshly solidified cake is broken up, treated with gaseous ammonia for one hour, and then air dried for twenty-four hours.

Example 4

100 parts of 37% formaldehyde is diluted with 100 parts of water. One tenth part of manganous sulfate is added and the solution acidified to pH 4.0. The temperature is raised to 60° C. and maintained there while 100 parts of urea are added slowly with vigorous agitation. A light pink precipitate forms which is separated from the mother liquor by centrifugation and air dried.

The mother liquor shows no precipitate when strong sodium hydroxide is added, showing that substantially all of the manganese is bound to the precipitate.

In all of these examples above, the condensation at elevated temperatures and in acid condition is discontinued promptly after the urea and formaldehyde have condensed to such intermediate stage as first to show insolubility in water, as by precipitation of the product or setting up on standing or cooling.

Example 5

25 parts of preformed urea and formaldehyde condensation product in the said stage are treated with 50 parts of a 0.1% aqueous solution of copper sulfate. The said product was turned a deep blue-green color by the copper. This color could not be extracted by repeated washings, indicating that the copper was firmly bound to the ureaform. The product is then dried.

Example 6

The procedure of any of the Examples 1–5 is followed except that any one of the trace elements disclosed herein is used in proportion to the urea and formaldehyde within the range shown.

PLANT USE

In a representative use, by conventional technique, of the fertilizer products made as described, there was selected the product of Example 2. This fertilizer was used with four *Kalmia latifolia* which were extremely chlorotic during the last portion of the 1955 growing season. These were dug up with the soil retained around the roots and placed in bushel baskets containing sterile sand. In this way the original soil on which they were growing was not altered. The plants were brought into the greenhouse and allowed to grow without further treatment. The new growth that developed was also chlorotic and to the same extent that the 1955 growth in the field was chlorotic. It was thus indicated that the plants were still growing in a deficient medium.

Of these four plants, three were selected for treatment and one was allowed to remain untreated as a control.

The treated plants received 4 grams each of the above minor element-ureaformaldehyde mixture at two intervals spaced 20 days apart. Therefore, the total application per plant was 8 grams. Within 9 days of the first application, new growth was developing which exhibited normal leaf color. At the end of 30 days after the first application and 10 days after the second application, each treated plant exhibited normal colored new growth and in many cases the original chlorotic new growth had improved in color.

The untreated control plant continued to produce small chlorotic new leaves.

It is to be understood that it is intended to cover all changes and modifications of the examples of the invention herein chosen for the purpose of illustration which do not constitute departures from the spirit and scope of the invention.

What we claim is:

1. In making a solid urea-formaldehyde condensate and trace element fertilizer in which the trace element is only slowly soluble in contact with ground water, the steps consisting of admixing about 0.5–1 mole of formaldehyde, 1 mole of urea, water, a trace element in the form of a compound thereof that is soluble in water at a pH within the range about 2.5–6 and selected from the group consisting of chlorides, sulfates, acid phosphates, oxides, carbonates, and hydroxides of iron, manganese, copper, molybdenum and zinc, and sulfuric acid in amount to establish and maintain the said pH, and maintaining the resulting mixture at all times at a temperature of approximately 15°–80° C. and at a pH within the said range until the formaldehyde and urea form a condensate that is only slowly soluble in water and until the trace element is chelated in the condensate as shown by reduction in the ionic activity of the trace element, the proportion of the trace element used being about 0.0002–0.004 part by weight for 1 part of the said condensate dry basis.

2. The process of making a neutralized fertilizer which includes mixing the said condensate with the chelated trace element therein that is the final product of the process of claim 1 with ammonia in amount to neutralize the acidity of the said product.

References Cited in the file of this patent

UNITED STATES PATENTS

| | | |
|---|---|---|
| 2,255,027 | Keenen et al. | Sept. 2, 1941 |
| 2,502,996 | Rohner | Apr. 4, 1950 |
| 2,618,546 | Davenport | Nov. 18, 1952 |
| 2,732,290 | Vana et al. | Jan. 24, 1956 |
| 2,766,283 | Darden | Oct. 9, 1956 |
| 2,770,538 | Vierling | Nov. 13, 1956 |
| 2,810,710 | Long | Oct. 22, 1957 |
| 2,827,368 | Mortenson | Mar. 18, 1958 |